(12) United States Patent
Ishikawa

(10) Patent No.: US 12,251,764 B2
(45) Date of Patent: Mar. 18, 2025

(54) LATHE

(71) Applicant: STAR MICRONICS CO., LTD., Shizuoka (JP)

(72) Inventor: Takayuki Ishikawa, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 721 days.

(21) Appl. No.: 17/329,504

(22) Filed: May 25, 2021

(65) Prior Publication Data
US 2021/0276106 A1    Sep. 9, 2021

Related U.S. Application Data

(63) Continuation of application No. PCT/JP2019/042480, filed on Oct. 30, 2019.

(30) Foreign Application Priority Data

Dec. 17, 2018    (JP) .................................. 2018-235842

(51) Int. Cl.
   *B23B 31/16*    (2006.01)
   *B23B 25/00*    (2006.01)
   (Continued)

(52) U.S. Cl.
   CPC .............. *B23B 31/16* (2013.01); *B23B 25/00* (2013.01); *B23B 31/2072* (2021.01); *B23B 31/26* (2013.01); *Y10T 279/17119* (2015.01)

(58) Field of Classification Search
   CPC ..... B23B 31/2072; B23B 31/16; B23B 31/26; B23B 3/16; B23B 25/00; B23B 31/206;
   (Continued)

(56) References Cited

U.S. PATENT DOCUMENTS 2,375,115 A    5/1945   Kylin
3,097,856 A    7/1963   Brown
(Continued)

FOREIGN PATENT DOCUMENTS

CN    106715013    5/2017
CN    108568535    9/2018
(Continued)

OTHER PUBLICATIONS

EPO, Search Report of EP 19899745.4 dated Jul. 19, 2022.
TIPO, Office Action of TW 108144642 dated May 5, 2023.

*Primary Examiner* — Eric A. Gates
*Assistant Examiner* — Reinaldo A Vargas Del Rio
(74) *Attorney, Agent, or Firm* — LEX IP MEISTER, PLLC

(57) ABSTRACT

A chuck operating apparatus includes a claw, a shifter, and a shifter drive unit. The rotatable claw has a first posture to bring the chuck into the opened state and a second posture to bring the chuck into the closed state. The rotatable shifter is brought in a first position to bring the claw into the first posture and in a second position to bring the claw into the second posture. The shifter drive unit has a shifter lever having an insertion part provided with a shifter bearing capable of being brought into contact with a side surface of an outward groove of the shifter. A roller is provided on one of the claw and the shifter in a contact position with the other to roll in a spindle axis direction and a groove is formed on the other to receive the roller when the chuck is in the opened state.

1 Claim, 12 Drawing Sheets

(51) Int. Cl.
*B23B 31/20* (2006.01)
*B23B 31/26* (2006.01)

(58) Field of Classification Search
CPC ........... B23B 31/207; Y10T 279/17119; Y10T 279/17521; B23Q 2039/008
See application file for complete search history.

(56) References Cited

U.S. PATENT DOCUMENTS

| | | |
|---|---|---|
| 4,049,282 A | 9/1977 | Yearsley |
| 10,427,260 B2 | 10/2019 | Masuda et al. |
| 2008/0069680 A1 | 3/2008 | Kato |
| 2008/0111291 A1 | 5/2008 | Navarro |
| 2011/0247387 A1 | 10/2011 | Buchanan |
| 2015/0001029 A1* | 1/2015 | Sueoka ................ G01M 15/04 192/71 |
| 2017/0232525 A1 | 8/2017 | Curtis et al. |
| 2018/0264610 A1 | 9/2018 | Ogasawara et al. |

FOREIGN PATENT DOCUMENTS

| | | |
|---|---|---|
| JP | 52-1780 | 1/1977 |
| JP | 2015-10903 | 1/2015 |
| JP | 2018-149643 | 9/2018 |
| KR | 10-2011-0072415 | 6/2011 |
| KR | 20160090499 | 8/2016 |
| TW | 200824836 | 6/2008 |
| TW | 201026432 | 7/2010 |

\* cited by examiner

LATHE

CROSS-REFERENCE TO RELATED APPLICATION

The present application is a continuation of PCT Application No. PCT/JP2019/042480, filed on Oct. 30, 2019, which claims priority of Japanese Patent Application No. 2018-235842 filed on Dec. 17, 2018. The contents of this application are incorporated herein by reference in their entirety.

BACKGROUND

(a) Field

The present invention relates to a lathe provided with a spindle having a chuck capable of releasably holding a workpiece.

(b) Description of the Related Art

In a well-known NC (numerical control) lathe, a front side of a workpiece held by a front spindle is machined and the workpiece is then passed to a back spindle for back machining to be performed on a back side of the workpiece. The front spindle and the back spindle each has a chuck such as a collet to hold the workpiece. As disclosed in Japanese Patent Application Publication No. 2018-149643 (especially, FIG. 2), the chucking mechanism has a shifter and a tilt claw. The shifter is mounted outside the spindle and movable in the spindle axis direction. The claw has an end protruding forwards to be in contact with the outer circumference of the shifter. The claw tilts in a direction that the distance between the end and the spindle axis varies. The shifter is of a shape surrounding the spindle on the spindle axis. A plurality of claws are in contact with the shifter. The shifter and the claws rotate on the spindle axis. The shifter moves to the rear to tilt the claw in a direction that the end separates from the spindle axis. The collet is thereby closed by a sleeve to hold the workpiece. The shifter moves to the front to tilt the claw in a direction that the end approaches the spindle axis by force of a collet open spring. The collet is thereby opened to release the workpiece.

A shifter drive unit has a shifter lever to move the shifter in the spindle axis direction. An outward groove is entirely formed around an outer surface of the shifter with respect to the spindle axis to receive an insertion part of the shifter lever. The shifter rotates on the spindle axis. The shifter lever does not rotate on the spindle axis. The insertion part of the shifter lever is provided with a shifter bearing. A shifter bearing of coaxial type has an inner ring rotatable on the spindle axis to fit in the outward groove of the shifter. The coaxial shifter bearing is larger in diameter since it is mounted outside the shifter with respect to the spindle axis. A shifter bearing of opposite type has an outer ring rotatable on a rotation axis perpendicular to the spindle axis to be capable of being brought into contact with a front side surface or a rear side surface of the outward groove. The opposite shifter bearing is smaller and less expensive than the coaxial shifter bearing.

Technical Problem

The shifter and the claw are in contact with each other. They rub against each other by operation of the chuck. Repeated machining causes wear of the shifter and the claw. A roller is provided in a contact position of the shifter and the claw to roll in the spindle axis direction. If a shifter bearing is kept in contact with the side surface of the outward groove of the shifter, the shifter bearing easily wears due to produced heat since a smaller bearing rotates faster than the back spindle. It is therefore desired that the shifter bearing is separated from both the side surfaces of the outward groove when the insertion part of the shifter is not activated. When the collet is closed, the shifter pushes the end of the claw in a diameter direction perpendicular to the spindle axis. The shifter is thereby kept not to move in the spindle axis direction to keep the shifter bearing separated from both the side surfaces of the outward groove. When the collet is opened, however, the shifter is released from such force to bring the shifter bearing into contact with the front side surface or the rear side surface of the outward groove. That shortens the life of the shifter bearing.

The present invention discloses a lathe capable of elongating the life of the shifter bearing.

A lathe of the invention includes a spindle rotatable on a spindle axis and provided with a chuck having a closed state to hold a workpiece and an opened state to release the workpiece and a chuck operating apparatus which opens and closes the chuck. The chuck operating apparatus includes a tilt claw provided outside the spindle and rotatable on the spindle axis, the claw having a first posture to bring the chuck into the opened state and a second posture to bring the chuck into the closed state; a shifter provided outside the spindle and rotatable on the spindle axis, the shifter being movable in a direction of the spindle axis to be brought in a first position to bring the claw into the first posture and in a second position to bring the claw into the second posture; and a shifter drive unit having a shifter lever which moves the shifter in the direction of the spindle axis. An outward groove is entirely formed around an outer surface of the shifter with respect to the spindle axis to receive an insertion part of the shifter lever. The insertion part of the shifter lever has a shifter bearing capable of being brought into contact with a side surface of the outward groove. A roller is provided on one of the claw and the shifter in a contact position with the other to roll in the direction of the spindle axis and a groove is formed on the other to receive the roller when the chuck is in the opened state.

The invention provides a lathe capable of elongating the life of the shifter bearing.

DETAILED DESCRIPTION

Figure 1:
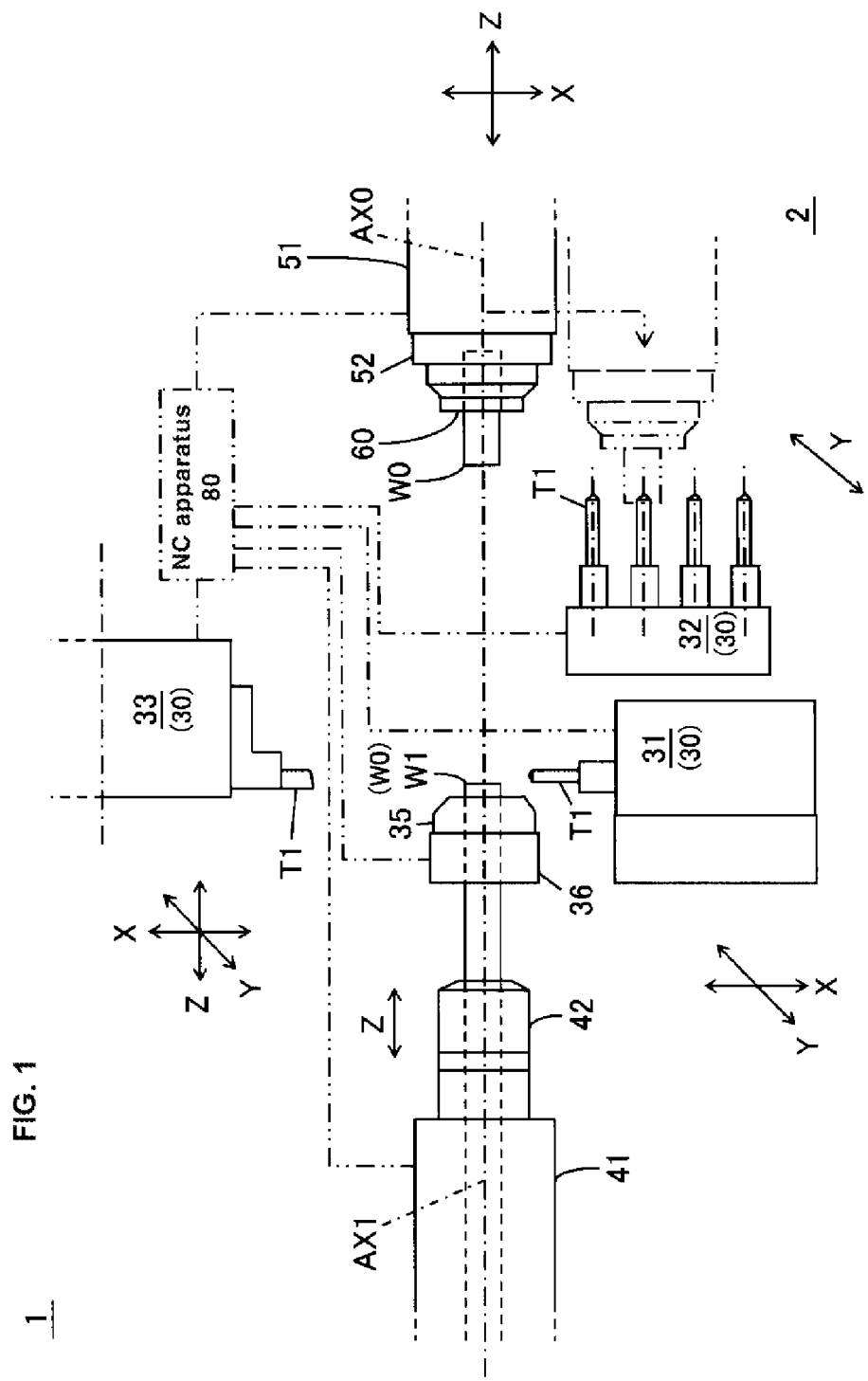
FIG. 1 schematically shows a configuration of a lathe.

Hereinafter, an embodiment of the present invention will be described. The invention is not limited to the exemplary embodiment and the features disclosed herein are not necessarily essential to the invention.

(1) TECHNOLOGY INCLUDED IN THE INVENTION

Technology of the invention will be described with reference to FIG. 1 to FIG. 16. The drawings only schematically show an example of the invention. They may have a mismatch to each other due to different magnification in each direction. Each element denoted by a symbol is only an example.

Embodiment 1

A lathe 1 of an embodiment of the technology may include a spindle (a back spindle 52, for example), a spindle support 53, a built-in motor 55, and a chuck operating apparatus 6. The spindle (52) rotatable on a spindle axis AX0 may be provided with a chuck 60 mounted at the front end thereof. The chuck 60 may have a closed state ST2 to hold a workpiece W0 and an opened state ST1 to release the workpiece W0. The spindle support 53 may rotatably support the spindle (52) by a front bearing B1 and a rear bearing B2. The built-in motor 55 may be disposed between the front bearing B1 and the rear bearing B2 to drive the spindle (52). The chuck operating apparatus 6 may include a tilt claw 20 and a shifter 10 to open and close the chuck 60. The claw 20 may be mounted outside the spindle (52) and between the front bearing B1 and the rear bearing B2. The claw 20 may have a first posture PO1 to bring the chuck 60 into the opened state ST1 and a second posture PO2 to bring the chuck 60 into the closed state ST2. The claw 20 may have a movable end 21 whose distance from the spindle axis AX0 varies between the first posture PO1 and the second posture PO2. The shifter 10 may be mounted outside the claw 20 and movable in a direction of the spindle axis AX0 (a Z-axis direction, for example). The shifter 10 may be brought in a first position LO1 to bring the claw 20 into the first posture PO1 and in a second position LO2 to bring the claw 20 into the second posture PO2.

Figure 13:
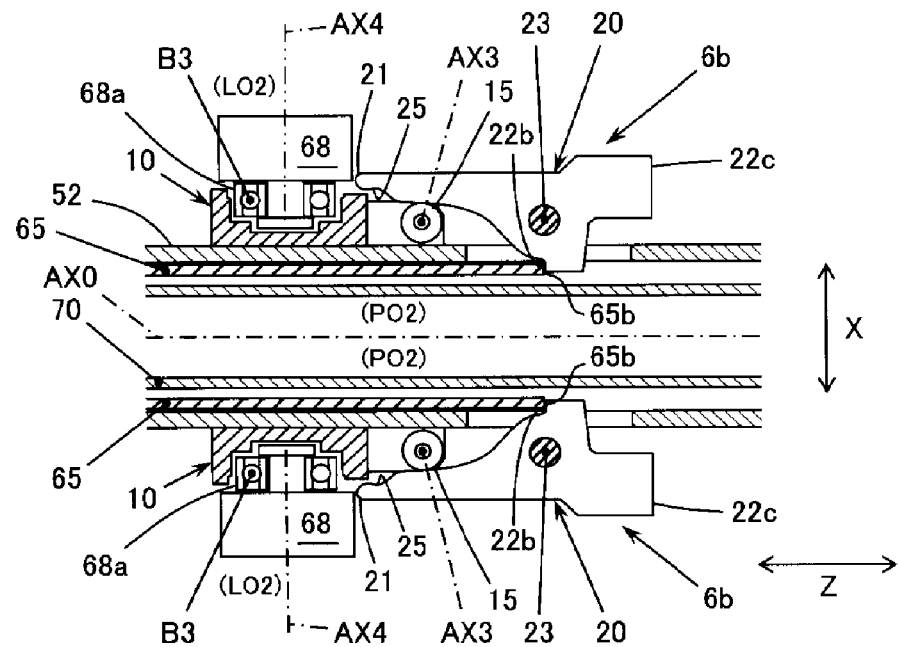
FIG. 13 is a vertical section view of the chucking mechanism of outer-claw type provided with a shifter having a roller in the state that the chuck is closed.
Figure 14:
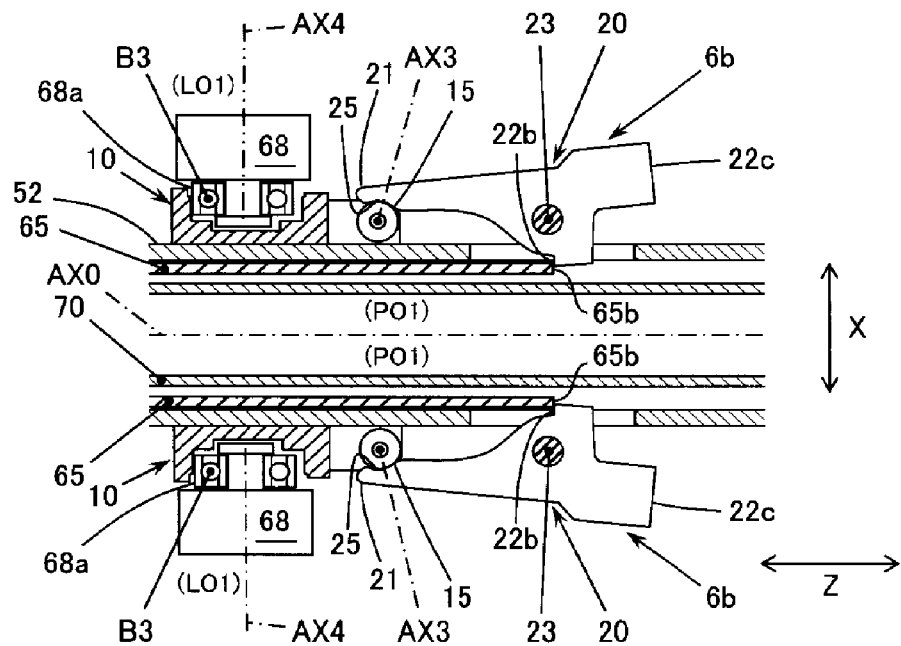
FIG. 14 is a vertical section view of the chucking mechanism of outer-claw type provided with a shifter having a roller in the state that the chuck is opened.

A comparative chucking mechanism of outer-claw type is being explained referring to FIG. 13 and FIG. 14. A chucking mechanism 6b having the shifter 10 and the claw 20 may be disposed in a position on the rear side of the rear bearing.

The shifter 10 may be mounted outside the back spindle 52 and movable in the Z-axis direction. The claw 20 may protrude forwards to keep contact with the outer circumference of the shifter 10 and have the movable end 21 tilting in a direction that the distance from the spindle axis AX0 varies. The shifter 10 may be of a shape surrounding the back spindle 52 with respect to the spindle axis AX0. A plurality of the claws 20 may be in contact with the shifter 10. The shifter 10 and the claw 20 may rotate on the spindle axis AX0. As shown in FIG. 14, the claw 20 may further have an extended heavier portion 22c provided on the rear side of a tilt axis to prevent the movable end 21 from going away from the spindle axis AX0 due to centrifugal force generated by forward movement of the shifter 10. The shifter 10 may be extended forwards from around the front end of the claw 20.

The chucking mechanism of outer-claw type is longitudinal in the spindle axis direction. It is therefore difficult to simply dispose such longer mechanism between the front bearing and the back bearing where the built-in motor is mounted. An additional intermediate bearing would be required to rotatably support the high speed rotation spindle. Such arrangement would make the headstock structure complicated and elongate the front part of the spindle too long. Further, the chucking mechanism disposed in a position on the rear side of the rear bearing would be disadvantageous to high speed rotations of the spindle.

In a chucking mechanism 6a according to Embodiment 1 of the invention, the shifter 10 may be mounted outside the claw 20 that is mounted outside the spindle 52. The shifter 10 may be movable in the direction of the spindle axis AX0. The chucking mechanism 6a may be shorter than the chucking mechanism 6b in the spindle axis direction, therefore eliminating the need of an intermediate bearing even when both the chucking mechanism 6a and the built-in motor 55 are disposed between the front bearing B1 and the rear bearing B2. The front part of the spindle (52) may be necessarily elongated to avoid interference of the headstock (51) with another structure such as a tool post 30. Then the chucking mechanism 6a may be disposed in a space of the headstock (51) supporting the elongated front part of the spindle (52). A rear part of the spindle (52) may be shortened instead. The embodiment provides a lathe capable of shortening the spindle in the spindle axis direction.

The spindle may include a main spindle also referred to as a front spindle and a sub spindle also referred to as a back spindle. The chuck may include a collet, a claw, and a variety of holders capable of holding a workpiece. The workpiece may include a product conceptually. The remarks described above may be applied to the following embodiments.

Embodiment 2

The lathe 1 may include a main headstock (a front headstock 41, for example) provided with a main spindle (a front spindle 42, for example) holding the workpiece W0, a tool post 30 machining the workpiece W0 held by the main spindle (42), and a sub headstock (a back headstock 51, for example) provided with a sub spindle (the back spindle 52, for example) opposite the main spindle (42) and receiving the workpiece W0 from the main spindle (42). The sub spindle (52) may correspond to the spindle in Embodiment 1. The sub headstock (51) moving in the spindle axis direction has a risk of interference with the tool post 30 machining the workpiece W0 held by the main spindle (42). The front part of the sub spindle (52) may be elongated to avoid such interference. The chucking mechanism 6a may be then disposed in an elongated front space of the sub headstock (51) adapted to the elongated front part of the sub spindle (52) and the rear part of the sub spindle (52) may be shortened instead. The embodiment provides a lathe capable of shortening the sub spindle in the spindle axis direction.

Embodiment 3

The claw 20 and the shifter 10 may be mounted in a position on the front side of the built-in motor 55 with respect to the direction of the spindle axis AX0. The chucking mechanism 6a may be smaller in diameter on the spindle axis AX0 while the built-in motor 55 may be larger. It is therefore convenient to arrange the chucking mechanism 6a in the elongated front space of the headstock (51) adapted to the elongated front part of the spindle (52) to avoid interference of the headstock (51) with the tool post 30 and other structures. The chucking mechanism 6a disposed in the elongated front space may be closer to the chuck 60 mounted at the front end of the spindle (52), which simplifies the structure of the chuck operating apparatus 6. The embodiment provides a lathe capable of shortening the spindle in the spindle axis direction.

Embodiment 4

The lathe 1 of another embodiment of the invention may include the spindle (the back spindle 52, for example) and the chuck operating apparatus 6. The spindle (52) may be rotatable on the spindle axis AX0 and provided with the chuck 60 having the closed state ST2 to hold the workpiece W0 and the opened state ST1 to release the workpiece W0. The chuck operating apparatus 6 may include the claw 20 and the shifter 10 to open and close the chuck 60. The tilt claw 20 mounted outside the spindle (52) may have the first posture PO1 to bring the chuck 60 into the opened state ST1 and the second posture PO2 to bring the chuck 60 into the closed state ST2. The shifter 10 mounted outside the spindle (52) may be movable in the direction of the spindle axis AX0 to be brought in the first position LO1 to bring the claw 20 into the first posture PO1 and in the second position LO2 to bring the claw 20 into the second posture PO2. The shifter 10 may be provided with a roller 15 in a contact position with the claw 20. The roller 15 may roll in the direction of the spindle axis AX0.

The roller 15 may be attached to the shifter 10 in the contact position with the claw 20. The roller 15 may roll in the spindle axis direction when the chuck 60 is operated. The friction of the shifter 10 against the claw 20 is reduced and the load on a driving source of the shifter 10 is thereby reduced. The roller 15 and the claw 20 touching each other gradually wear but wear amount is reduced. The embodiment facilitates parts replacement since replacement of the roller 15 does not require a time-consuming replacement of the whole shifter 10 mounted entirely around the spindle (52). The roller may be attached to the claw 20. It, however, would gradually cause wear of the roller and the shifter touching each other and result in replacement of the whole shifter. In this embodiment, only the roller is the contact point of the shifter and the claw, which eliminates the need of replacement of the whole shifter. The embodiment provides a lathe capable of facilitating maintenance of the chucking mechanism.

Embodiment 5

The shifter 10 may be provided with a hold 14 removably having a pin (a roller pin 16, for example) extended along a rolling axis AX3 of the roller 15. The roller 15 may have an insertion hole 15a through which the pin (16) is passed in the AX3-axis direction. The roller 15 may roll on the pin (16) passed in the hole 15a. An operator can take the roller 15 out of the shifter 10 only by removing the pin (16) from the hold 14. The operator can attach the roller 15 to the shifter 10 only by mounting the pin (16) passed in the hole 15a to the hold 14. The embodiment provides a lathe capable of facilitating maintenance of the chucking mechanism.

Embodiment 6

The lathe 1 of another embodiment of the invention may include the spindle (the back spindle 52, for example) and the chuck operating apparatus 6. The spindle (52) may be rotatable on the spindle axis AX0 and provided with the chuck 60 having the closed state ST2 to hold the workpiece W0 and the opened state ST1 to release the workpiece W0. The chuck operating apparatus 6 may include the claw 20, the shifter 10, and a shifter drive unit DR1 to open and close the chuck 60. The tilt claw 20 mounted outside the spindle (52) may have the first posture PO1 to bring the chuck 60 into the opened state ST1 and the second posture PO2 to bring the chuck 60 into the closed state ST2. The shifter 10 mounted outside the spindle (52) may be movable in the spindle axis direction to be brought in the first position LO1 to bring the claw 20 into the first posture PO1 and in the second position LO2 to bring the claw 20 into the second posture PO2. The shifter drive unit DR1 may have a shifter lever 68 to move the shifter 10 in the direction of the spindle axis AX0. The shifter 10 may have an outward groove 12 formed entirely around an outer surface 11 of the shifter 10 with respect to the spindle axis AX0 to receive an insertion part 68a of the shifter lever 68. The insertion part 68a may be provided with a shifter bearing B3 capable of being brought into contact with a side surface 12a, 12b of the outward groove 12. The roller 15 rolling in the direction of the spindle axis AX0 may be provided in one of the claw 20 and the shifter 10 in a contact position with the other. A groove 25 may be formed on the other to receive the roller 15 when the chuck 60 is in the opened state ST1.

When the chuck 60 is in the opened state ST1, the roller 15 mounted on one of the claw 20 and the shifter 10 may fit in the groove 25 formed in the other. Accordingly, the shifter bearing B3 can be kept separated from both the side surfaces 12a and 12b of the outward groove 12 of the shifter 10 even when the chuck 60 is in the opened state ST1. The embodiment provides a lathe capable of elongating the life of the shifter bearing.

Embodiment 7

The lathe 1 of another embodiment of the invention may include the spindle (the back spindle 52, for example) and the chuck operating apparatus 6. The spindle (52) may be rotatable on the spindle axis AX0 and provided with the chuck 60 having the closed state ST2 to hold the workpiece W0 and the opened state ST1 to release the workpiece W0. The chuck operating apparatus 6 may include the claw 20, the shifter 10, and the shifter drive unit DR1 to open and close the chuck 60. The tilt claw 20 mounted outside the spindle (52) and rotatable on the spindle axis AX0 may have the first posture PO1 to bring the chuck 60 into the opened state ST1 and the second posture PO2 to bring the chuck 60 into the closed state ST2. The shifter 10 mounted outside the spindle (52) and rotatable on the spindle axis AX0 may be movable in the direction of the spindle axis AX0 (the Z-axis direction, for example) to be brought in the first position LO1 to bring the claw 20 into the first posture PO1 and in the second position LO2 to bring the claw 20 into the second posture PO2. The shifter drive unit DR1 may have the shifter lever 68 to move the shifter 10 in the direction of the spindle axis AX0. The shifter 10 may have the outward groove 12 formed entirely around the outer surface 11 thereof with respect to the spindle axis AX0 to receive the insertion part 68a of the shifter lever 68. The insertion part 68a may be provided with the shifter bearing B3 capable of being brought into contact with the side surface 12a, 12b of the outward groove 12. The shifter drive unit DR1 may drive the shifter lever 68 to first move the shifter 10 in the direction of the spindle axis AX0 and then separate the shifter bearing B3 from the side surface 12a, 12b of the outward groove 12.

The shifter lever 68 driven by the shifter drive unit DR1 may first move the shifter 10 in the direction of the spindle axis AX0 and then separate the shifter bearing B3 from the side surface 12a, 12b of the outward groove 12. It is therefore possible to keep the shifter bearing B3 separated from both the side surfaces 12a and 12b of the outward groove 12. The embodiment provides a lathe capable of elongating the life of the shifter bearing.

(2) CONFIGURATION OF THE LATHE

FIG. 1 schematically shows a configuration of the NC (numerical control) lathe 1 provided with the movable front spindle 42. FIG. 1 is only a simplified example for explanation and the invention is not limited thereto. A positional relation between elements is only an example for explanation. The left and right direction may be replaced by the up and down direction or the front and back direction. The up and down direction may be replaced by the left and right direction or the front and back direction. The front and back direction may be replaced by the left and right direction or the up and down direction. The rotational direction may be inversed. If something is the same as something in direction or position, they may be the same or almost the same within an error range.

The lathe 1 may include the front headstock 41 provided with the front spindle 42, a guide bush 35, the back headstock 51 provided with the back spindle 52, a gang tool post 31, a tool post for back machining 32, a turret tool post 33, all of which may be mounted on a base 2. The front spindle 42 may be an example of the main spindle. The front headstock 41 may be an example of the main headstock. The back spindle 52 may be an example of the sub spindle. The back headstock 51 may be an example of the sub headstock. The gang tool post 31, the tool post for back machining 32, and the turret tool post 33 may be collectively referred to as the tool post 30. The lathe 1 may further include an NC (numerical control) apparatus 80 which controls movement of the front headstock 41, the back headstock 51, the guide bush 35, and the tool post 30. The NC apparatus 80 may be arranged in a different position from that shown in FIG. 1.

As shown in FIG. 1, the front headstock 41 provided with the front spindle 42 may be movable in the Z-axis direction. The back headstock 51 provided with the back spindle 52 may be movable in the Z-axis direction and in the X-axis direction. The gang tool post 31 may be movable in the X-axis direction and in the Y-axis direction. The tool post for back machining 32 may be movable in the Y-axis direction. The turret tool post 33 may be movable in the X-axis direction, in the Y-axis direction, and in the Z-axis direction. The Z-axis direction may be an example of a direction of the spindle axis. The Z-axis direction may be perpendicular to the X-axis direction. The Z-axis direction may be perpendicular to the Y-axis direction. The X-axis direction may be perpendicular to the Y-axis direction. The Z-axis direction and the X-axis direction may cross each other at any angle except right angles. The Z-axis direction and the Y-axis direction may cross each other at any angle except right angles. The X-axis direction and the Y-axis direction may cross each other at any angle except right angles. The direction of movement of the front headstock 41, the back headstock 51, and the tool post 30 may not be limited to those in FIG. 1.

The base 2 may be referred to as a bed or a table. The base 2 may directly or indirectly support the front headstock 41, the guide bush 35, the back headstock 51, and the tool post 30. The guide bush 35 may be supported by a guide bush support 36 on the base 2 as shown in FIG. 1.

The front spindle 42 may be provided with a chuck such as a collet to releasably hold a cylindrical (bar) workpiece W1 inserted in the Z-axis direction. The NC apparatus 80 may rotate the front spindle 42 on a spindle axis AX1 extended in the longitudinal direction of the workpiece W1 by a driving unit such as a built-in motor. The front spindle 42 may thereby rotate the workpiece W1 on the spindle axis AX1. The guide bush 35 provided in a position on the front side of the front spindle 42 may slidably support the longitudinal workpiece W1 inserted in the front spindle 42 in the Z-axis direction. The guide bush 35 may be rotatable on the spindle axis AX1 in synchronization with the front spindle 42. The technology may be applied to a lathe where no guide bush is provided.

The back spindle 52 may receive the workpiece W1 whose front side has been machined from the front spindle 42 opposite the back spindle 52. The back spindle 52 may be provided with the chuck 60 such as a collet to releasably hold the workpiece W0, whose front side has been machined, inserted in the Z-axis direction with the spindle axes AX1 and AX0 are aligned. The NC apparatus 80 may rotate the back spindle 52 on the spindle axis AX0 by a driving unit such as the built-in motor 55. The back spindle 52 may thereby rotate the workpiece W0 on the spindle axis AX0. The back spindle 52 may be referred to as an opposite spindle since it is opposite the front spindle. The spindle axis AX1 of the front spindle 42 and the spindle axis AX0 of the back spindle 52 may be collectively called the spindle axis AX0. The workpiece W1 held by the front spindles 42 and the workpiece W0 held by the back spindle 52 may be collectively called the workpiece W0.

The tool post 30 may have a plurality of tools T1 attached there. The gang tool post 31 and the turret tool post 33 may be available in machining the front side of the workpiece W1 supported by the guide bush 35. The plurality of the tools T1 may include a cut-off tool for use to cut off the workpiece W0 held by both the front spindle 42 and the back spindle 52. The tool post for back machining 32 and the turret tool post 33 may be available in machining the back side of the workpiece W0 cut off with the cut-off tool.

The NC apparatus 80 may include a CPU (Central Processing Unit), a ROM (Read Only Memory), a RAM (Random Access Memory), a timer circuit, and an I/F (Interface) to execute an NC program upon receipt of input via a not-shown operation panel or an external computer. The NC apparatus 80 may control movement of the headstock 41, the headstock 51, and the tool post 30 and further control rotation of the front spindle 42, the back spindle 52, and the guide bush 35. The NC program may be stored in the RAM by the operator via the operation panel 80 and the external computer.

Figure 2:
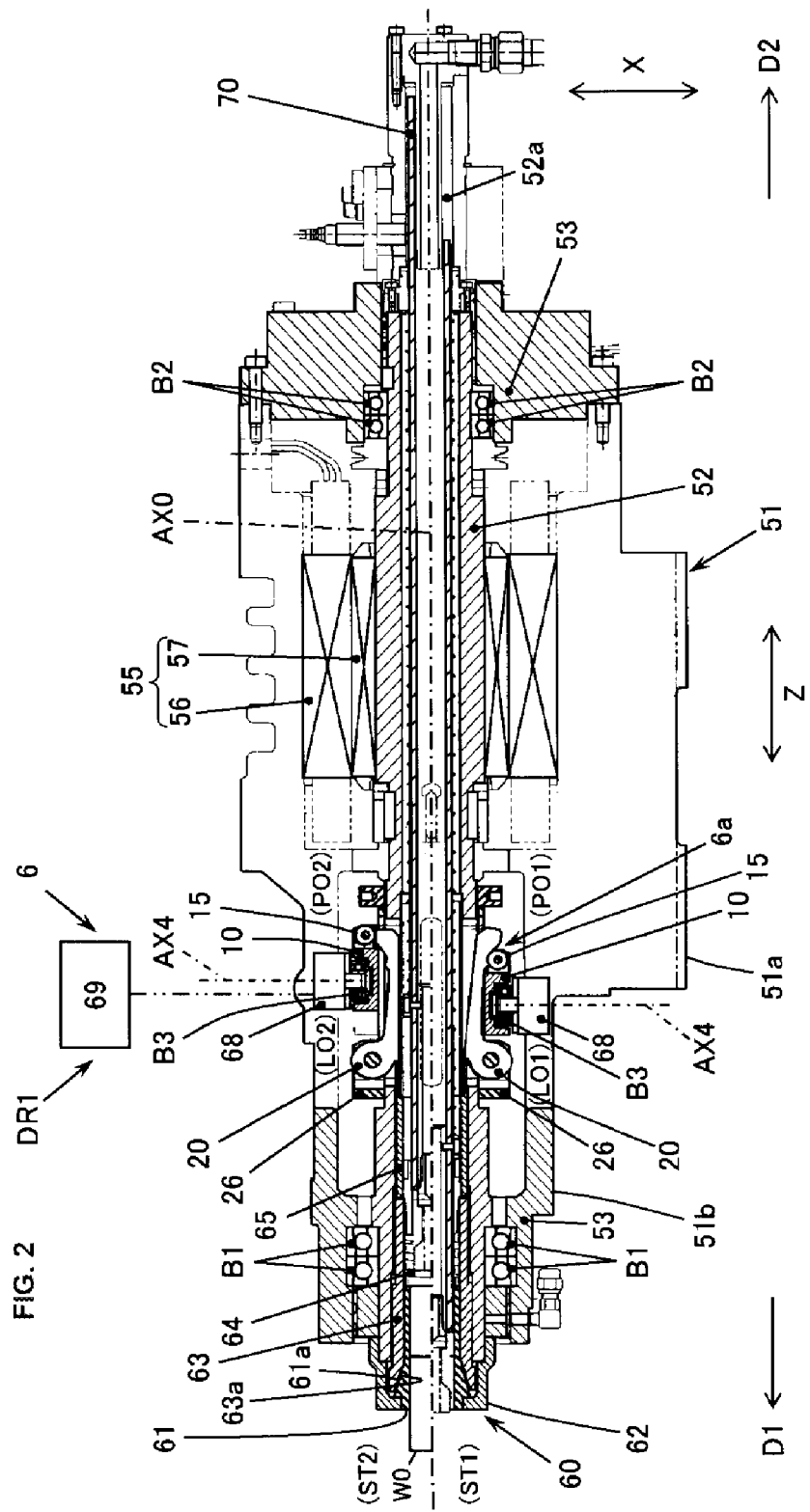
FIG. 2 is a vertical section view schematically showing a sub headstock.
Figure 3:
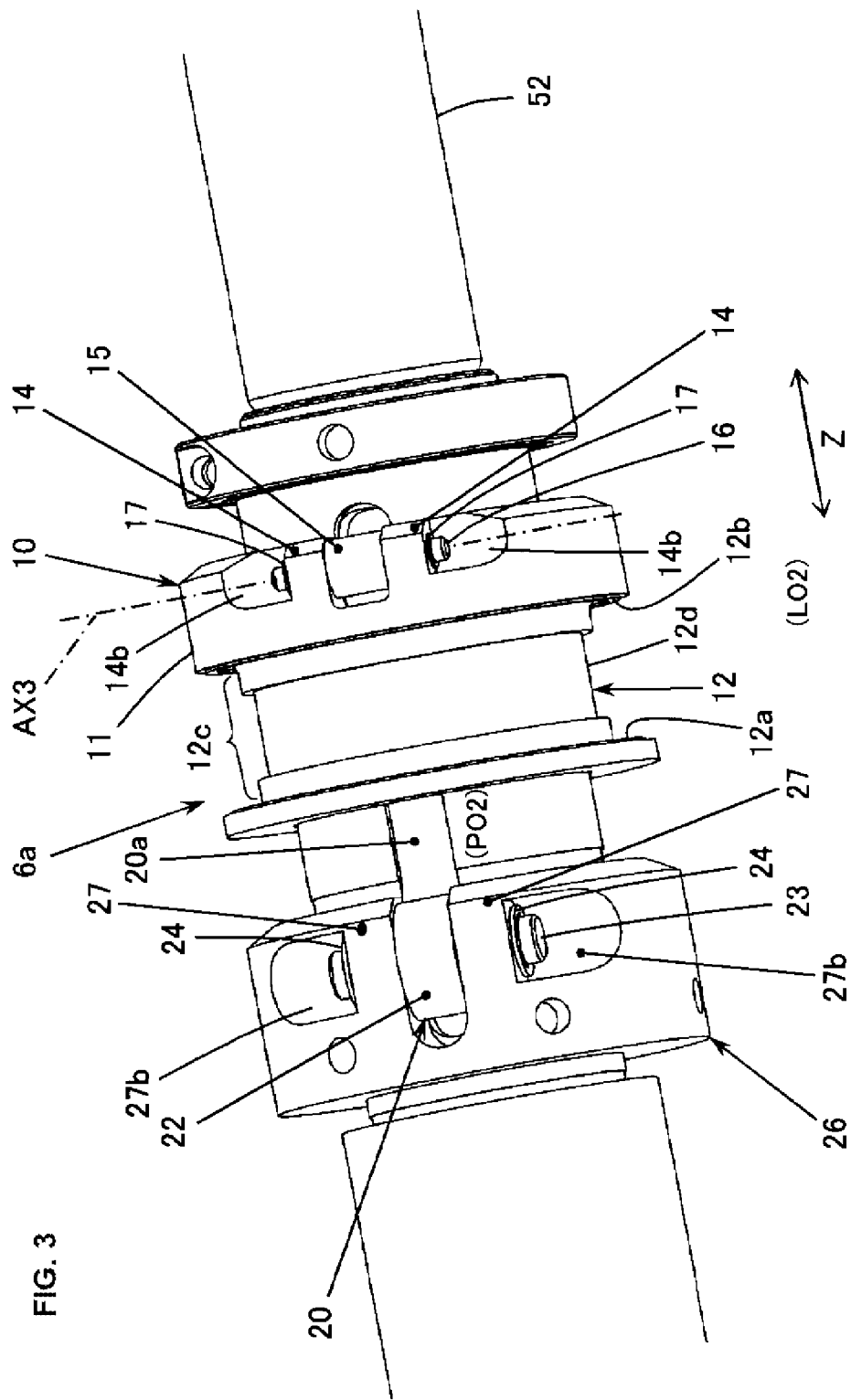
FIG. 3 is a perspective view around a chucking mechanism.
Figure 4:
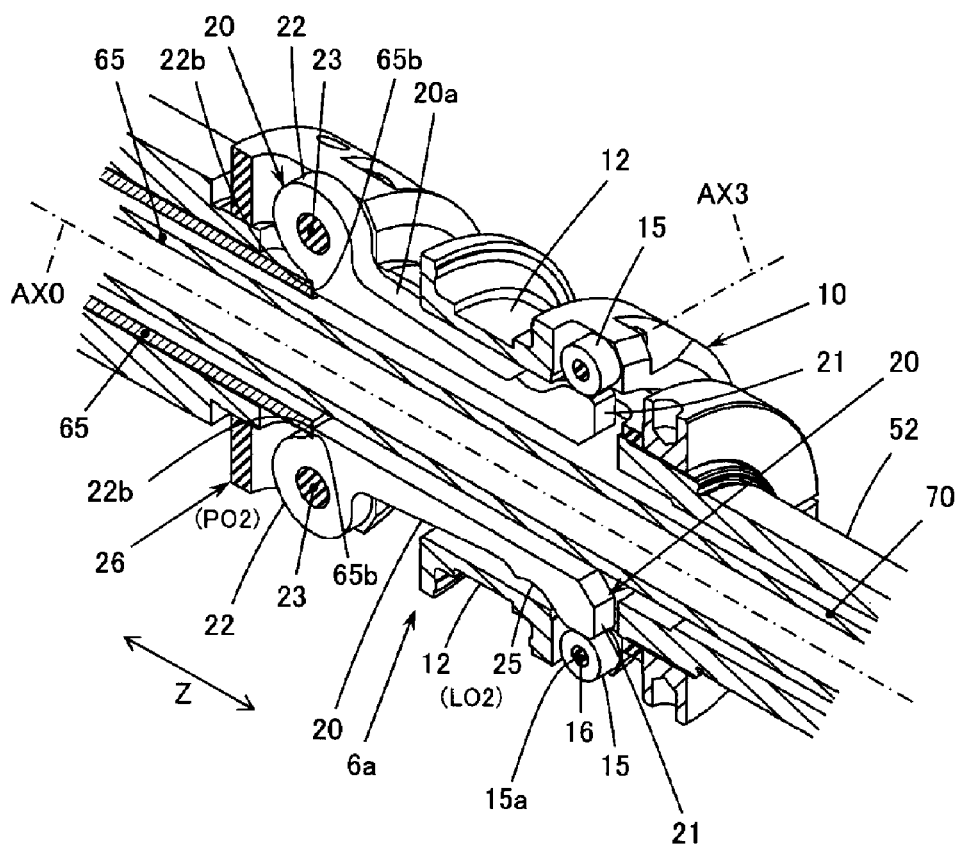
FIG. 4 is a vertical section view around the chucking mechanism.
Figure 5:
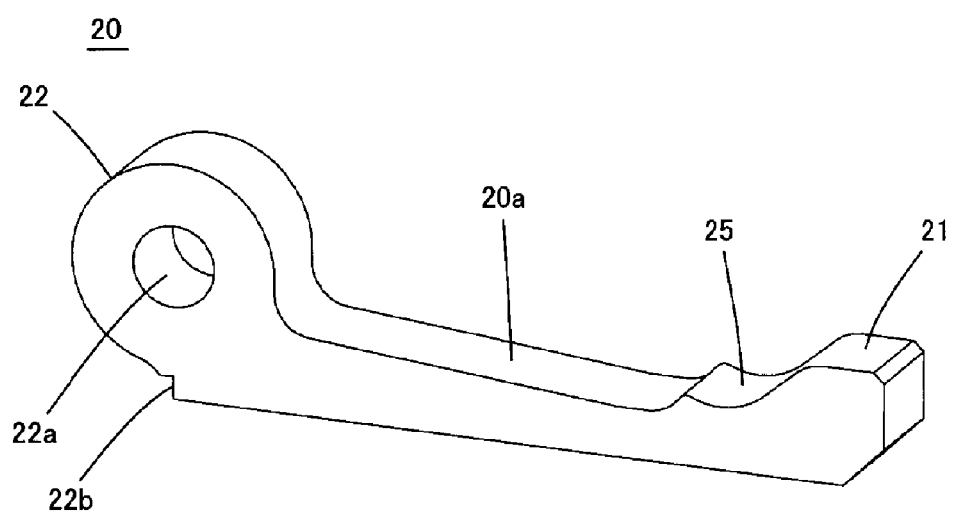
FIG. 5 is a perspective view of a claw.
Figure 6:
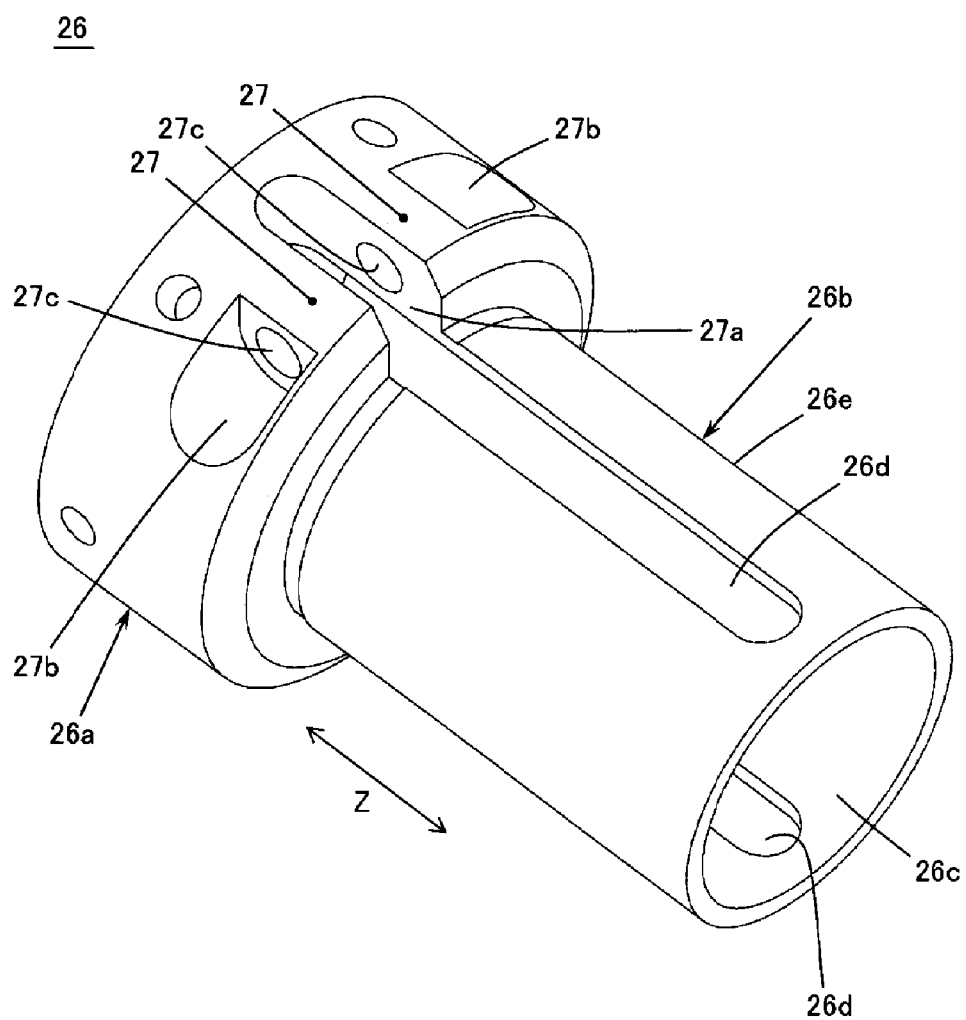
FIG. 6 is a perspective view of a claw holder.
Figure 7:
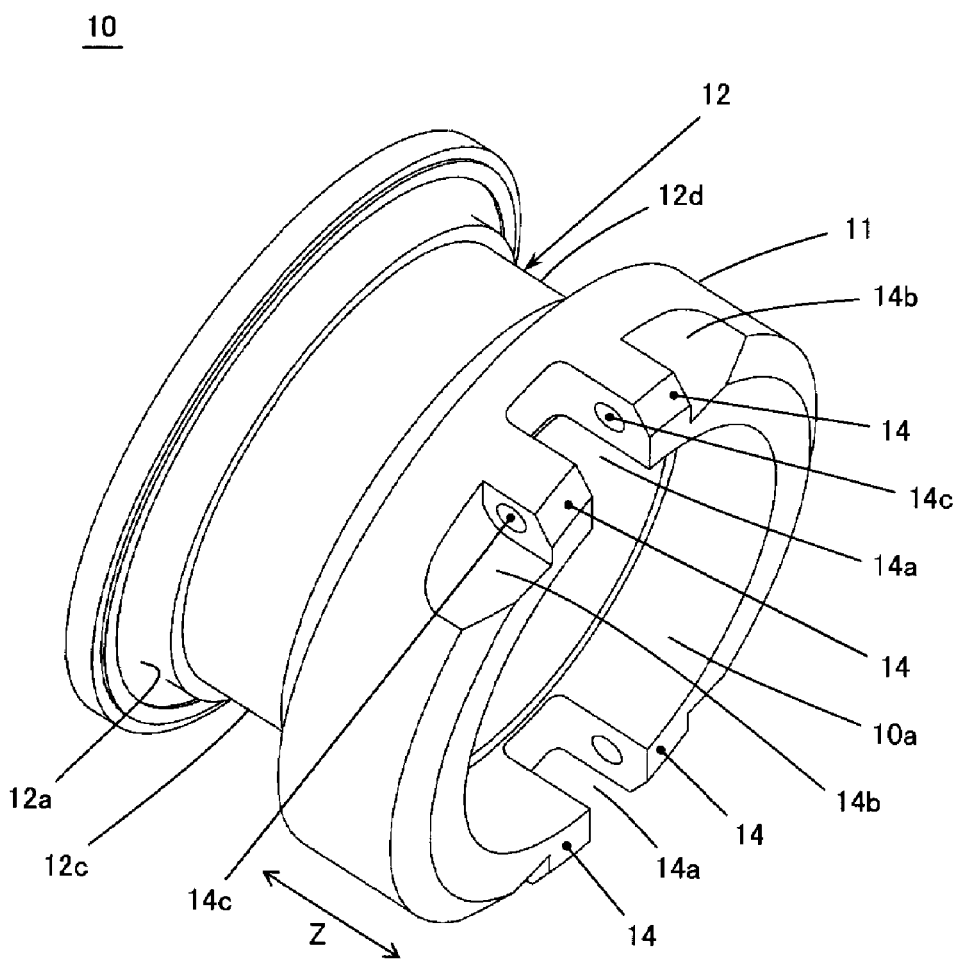
FIG. 7 is a perspective view of a shifter.
Figure 8:
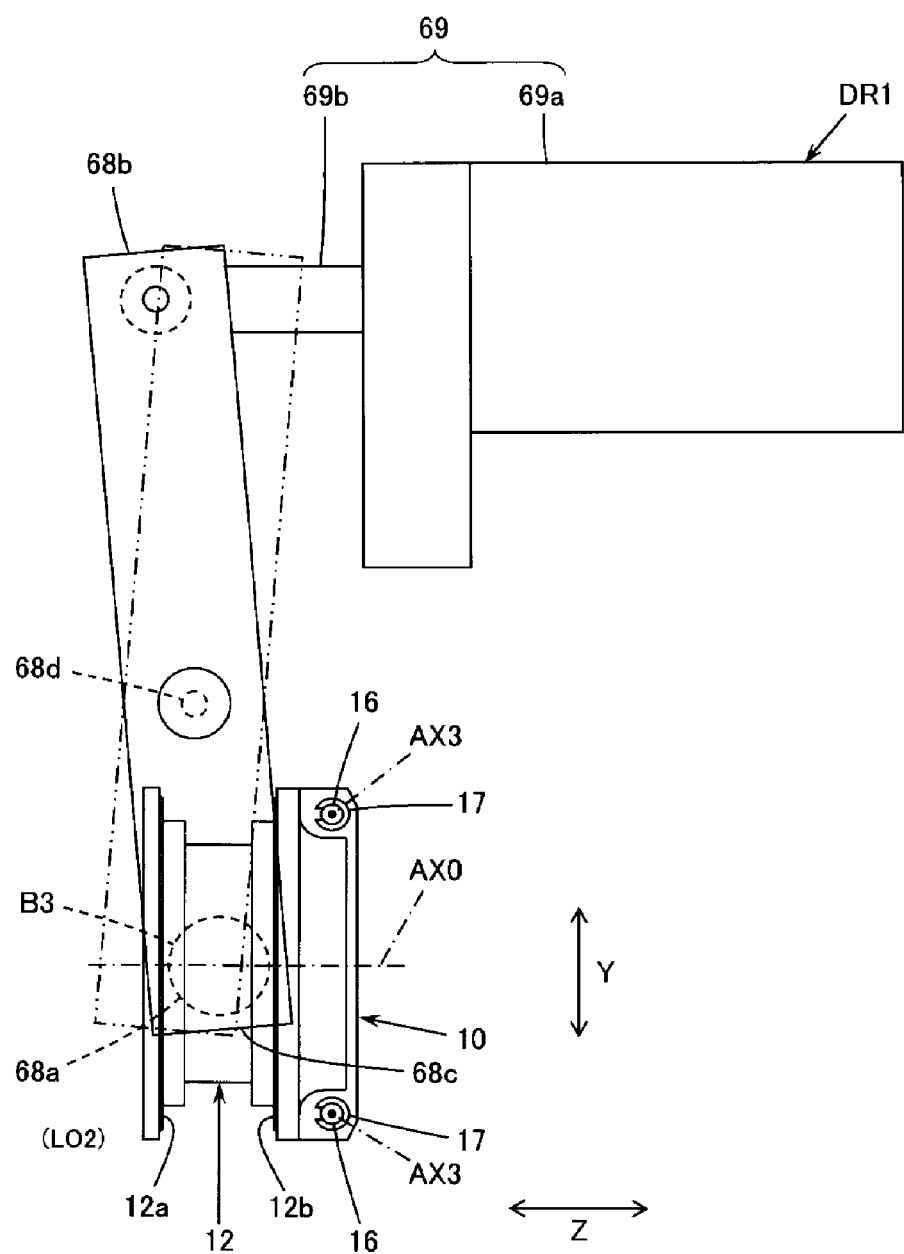
FIG. 8 schematically shows a shifter drive unit.

FIG. 2 is a vertical section view schematically showing the back headstock 51 along the spindle axis AX0 including a block diagram of an actuator 69 in a distant position. The upper side with respect to the spindle axis AX0 shows the closed state in which a collet 61 is in the closed state ST2 and a product ejector 70 is retracted toward the right. The lower side with respect to the spindle axis AX0 shows the opened state in which the collet 61 is in the opened state ST1 and the product ejector 70 is advanced toward the left. For convenience of explanation, the workpiece W0 as a product may be ejected toward the left (to the front side D1) by the ejector 70 and the ejector is retracted to the right (to the rear side D2). The direction separating from the spindle axis AX0 is an outward direction while the direction approaching the spindle axis AX0 is an inward direction. The front or forward side, the rear or rearward side, the outer or outward side, and the inner or inward side each represents positional relationship. A position represented by the front or forward side or the rear or rearward side may include a range of approximate positions in the Z-axis direction. A position represented by the outer or outward side and the inner or inward side may include a range of approximate positions in a direction perpendicular to the spindle axis AX0. FIG. 3 schematically shows an appearance of the chucking mechanism 6a mounted outside the back spindle 52. FIG. 4 schematically shows a vertical section of the chucking mechanism 6a mounted outside the back spindle 52. FIG. 5 schematically shows an appearance of the claw 20 of the chucking mechanism 6a. FIG. 6 schematically shows an appearance of a claw holder 26 holding the tilt claw 20. FIG. 7 schematically shows an appearance of the shifter 10 of the chucking mechanism 6a. FIG. 8 schematically shows the shifter drive unit DR1. FIG. 9 to FIG. 12 each schematically shows a vertical section around the chucking mechanism 6a. For ease of understanding, the section view in FIG. 2 and FIG. 4 includes non-hatched sections.

The back headstock 51 may be provided with the back spindle 52 having the collet 60 holding the workpiece W0 whose front side has been machined, the spindle support 53 supporting the back spindle 52, the built-in motor 55 driving the back spindle 52, the chuck operating apparatus 6 operating the chuck 60, and the product ejector 70 ejecting the workpiece W0 as a product. The spindle support 53 may be integrally formed with the back headstock 51 and may be a separate member mounted on the back headstock 51. The spindle support 53 may comprise a front unit having the front bearing B1 and a rear unit having the rear bearing B2. The front unit may be integrally formed with the back headstock 51 while the rear unit may be a separate member mounted on the back headstock 51. The front unit may be a separate member mounted on the back headstock 51 while the rear unit may be integrally formed with the back headstock 51. The product ejector 70 may be replaced by a product pipe through which the workpiece W0 as a product is carried to the right in FIG. 2

The back spindle 52 may be provided with a through-hole 52a for passing the product ejector 70 in the Z-axis direction. The back spindle 52 may be rotatably mounted on the spindle support 53 by the rolling bearings B1 and B2 to be driven by the built-in motor 55 to rotate on the spindle axis AX0. A chuck sleeve 63 and a push sleeve 65 may be inserted into the through-hole 52a in the Z-axis direction. The chuck sleeve 63 and the push sleeve 65 each may have a through-hole along the spindle axis AX1 where the product ejector 70 is inserted in the Z-axis direction. The sleeves 63 and 65 surrounding the product ejector 70 may rotate on the spindle axis AX1 as the back spindle 52 is rotated.

The chuck 60 mounted at the front end of the back spindle 52 may include the collet 61 and a cap 62. The collet 61 may have a tapered part 61a on the outer circumference thereof. The tapered part 61a may be gradually thinner toward the rear. The tapered part 61a may have a slit formed in a plurality of positions (three positions, for example). The cap 62 may be attached at the front end of the back spindle 52 to hold the collet 61. The collet 61 may hold the workpiece W0 when the tapered part 61a is pushed by an inverted tapered part 63a of the chuck sleeve 63. The collet 61 may release the workpiece W0 when the tapered part 61a is released from the inverted tapered part 63a. The chuck 60 may have the closed state ST2 holding the workpiece W0 and the opened state ST1 releasing the workpiece W0. The collet 61 may rotate as the back spindle is rotated. The workpiece W0 released from the collet 61 may be ejected to the left (in FIG. 2) as the product ejector 70 is advanced.

The front bearing B1 may be mounted in a position on the front side of the chucking mechanism 6a. The rear bearing B2 may be mounted in a position on the rear side of the built-in motor 55. The bearings B1 and B2 in FIG. 2 may be ball bearings, but they may be roller bearings and others. The inner ring of the bearing may be mounted on the outer circumference of the back spindle 52. The outer ring of the bearing may be mounted on the spindle support 53.

As shown in FIG. 1, a plurality of structures such as the gang tool post 31, the tool post 32 for back machining, and the turret tool post 33 may exist in a direction from the back headstock 51 toward the guide bush support 36 of the guide bush 35. The back headstock 51 may have a body part 51a movable in the X-axis and Z-axis directions with respect to the base 2. The body part 51a can approach the guide bush 35 only to the extent that interference with the tool post 30 is avoided. The back spindle 52 may have an elongated front part to bring the front end close to the guide bush 35. The back headstock 51 may have an elongated part 51b rotatably supporting the elongated front part of the back spindle 52. The part 51b may be elongated to the extent that interference with the tool post 30 and other structures is avoided.

The built-in motor 55 may be mounted in a position on the rear side of the chucking mechanism 6a between the front bearing B1 and the rear bearing B2. The built-in motor 55 may be provided with a stator 56 on the side of the spindle support 53 and with a rotor 57 on the side of the back spindle 52 to rotate the back spindle 52 under timing control of the NC apparatus 80. The back spindle 52 may be driven by an external motor with a belt. The expanding and shrinking belt causes a problem that the rotations of the back spindle cannot exactly follow the rotations of the motor. Further, repeated operations cause a wear or breakage of the belt. Use of the built-in motor 55 eliminates the problem and improves the rotation following capability of the back spindle 52.

The chuck operating apparatus 6 may include the chuck sleeve 63, a collet open spring 64, the push sleeve 65, the chucking mechanism 6a including the claw 20 and the shifter 10, and the shifter drive unit DR1 including the shifter lever 68 and the collet actuator 69. In Embodiments 6 and 7 of the invention, the shifter 10 may be an example of one member and the claw 20 may be an example of the other member.

The chuck sleeve 63 having the inverted tapered part 63a on the inner circumference of the front end thereof may be mounted outside the collet 61 with respect to the spindle axis AX0. The inverted tapered part 63a may become gradually separated from the spindle axis AX0 toward the front as along the tapered part 61a of the collet 61. The chuck sleeve 63 may be slidable in the Z-axis direction. As the chuck sleeve 63 slides toward the front, the tapered part 61a of the collet 61 may be tightened inwards (into the closed state ST2). As the chuck sleeve 63 slides toward the rear, the tapered part 61a of the collet 61 may be loosened (into the opened state ST1). The spring 64 may include a coil spring. The spring 64 may be hooked to the collet 61 at a front end and to the inner circumference of the chuck sleeve 63 at a rear end to apply rearward force to the chuck sleeve 63. The front end face of the push sleeve 65 may be in contact with the rear end face of the chuck sleeve 63. As shown in FIG. 4, a rear end face 65b of the push sleeve 65 may be in contact with a contact end 22b of the claw 20. The push sleeve 65 may be slidable in the Z-axis direction. The push sleeve 65 may move toward the front when pushed by the claw 20 and move toward the rear by rearward force of the spring 64 when released from the claw 20.

The chucking mechanism 6a may be mounted outside the back spindle 52 and between the front bearing B1 and the rear bearing B2. The chucking mechanism 6a of the embodiment may be an inner-claw type that the claw 20 is mounted inside the shifter 10 with respect to the spindle axis AX0. The chucking mechanism 6a may be mounted in a position on the front side of the built-in motor 55 with respect to the Z-axis direction.

The claw 20 of the chucking mechanism 6a may be mounted outside the back spindle 52 with respect to the spindle axis AX0 and between the front bearing B1 and the rear bearing B2 to be rotatable on the spindle axis AX0. As shown in FIG. 4, the chucking mechanism 6a may include the claws 20 in opposite positions with respect to the spindle axis AX0. The front end of the claw 20 may be a root 22 whose distance from the spindle axis AX0 is substantially constant. The rear end of the claw 20 may be the movable end 21 whose distance from the spindle axis AX0 varies. As shown in FIG. 5, a recess 20a may be formed on the outer surface of the claw 20 with respect to the spindle axis AX0. The recess 20a may be dented toward the spindle axis AX0 between the root 22 and the movable end 21. The shifter 10 may be mounted outside the claw 20 in a position corresponding to the recess 20a.

The root 22 may have a through-hole 22a and the contact end 22b. A claw pin 23 may be inserted into the through-hole 22a in the direction of the tilt axis as shown in FIG. 3 and FIG. 4. The contact end 22b may be in contact with the rear end face 65b of the push sleeve 65. The claw 20 may tilt on the claw pin 23 inserted into the through-hole 22a. The contact end 22b may be closer to the spindle axis AX0 than the hole 22a is. The contact end 22b may be pushed toward the rear by the rear end face 6b of the push sleeve 65. The contact end 22b may push the rear end face 6b of the push sleeve 65 toward the front.

The movable end 21 of the claw 20 may vary in distance from the spindle axis AX0 according to operation of the claw 20. As shown in the lower half of FIG. 2 with respect to the spindle axis AX0, when the contact end 22b of the claw 20 is pushed toward the rear by the push sleeve 65, the movable end 21 may be brought into the first posture PO1 in which the movable end 21 is comparatively distant from the spindle axis AX0 to thereby bring the collet 61 into the opened state ST1. As shown in the upper half of FIG. 2 with respect to the spindle axis AX0, when the contact end 22b of the claw 20 pushes the push sleeve 65 toward the front, the movable end 21 may be brought into the second posture PO2 in which the movable end 21 is comparatively close to the spindle axis AX0 to thereby bring the collet 61 into the closed state ST2. The claw 20 may have the first posture PO1 in which the movable end 21 is comparatively distant from the spindle axis AX0 to thereby bring the collet 61 into the opened state ST1 and the second posture PO2 in which the movable end 21 is comparatively close to the spindle axis AX0 to thereby bring the collet 61 into the closed state ST2.

The recess 20a of the claw 20 may have the groove 25 formed near the movable end 21. The roller 15 of the shifter 10 may fit in the groove 25 when the movable end 21 is comparatively distant from the spindle axis AX0 (when the claw 20 is in the first posture PO1 to bring the collet 61 into the opened state ST1). The direction of the groove 25 may be perpendicular to the spindle axis AX0. The roller 15 of the shifter 10 may roll on the outer side surface of the claw 20 with respect to the spindle axis AX0 from the groove 25 to the movable end 21. The outer side surface of the movable end 21 may be outside the outer side surface of the recess part 20a with respect to the spindle axis AX0. The claw 20 may tilt around the through-hole 22a of the root 22. When the contact position of the roller 15 with the claw 20 is changed from the groove 25 to the movable end 21, the movable end 21 may be brought close to the spindle axis AX0 to thereby bring the collet 61 into the closed state ST2.

The chucking mechanism 6a may further include the claw holder 26 mounted outside the back spindle 52 as shown in FIG. 6. The claw holder 26 may have a larger diameter portion 26a at the front side thereof and a thinner diameter portion 26b extended from the larger diameter portion 26a to the rear end thereof. The claw holder 26 may have a through-hole 26c continuing from the larger diameter portion 26a to the thinner diameter portion 26b. The back spindle 52 may be inserted into the through-hole 26c in the Z-axis direction. The thinner diameter portion 26b may have a slit 26d in a position corresponding to the claw 20. The shifter 10 may be slidably mounted outside the thinner diameter portion 26b with respect to the spindle axis AX0. The outer circumference 26e of the thinner diameter portion 26b may act as a guide surface for the shifter 10 sliding in the Z-axis direction. The larger diameter portion 26a may be provided with a claw pin hold 27 for removably holding the claw pin 23 whose longitudinal direction may be along the tilt axis of the claw 20. The claw pin hold 27 may be divided by a gap 27a receiving the root 22 of the claw 20. The larger diameter portion 26a may have a recess 27b adjacent to the hold 27 each. The hold 27 each may be a part between the gap 27a and the recess 27b. The hold 27 each may have a through-hole 27c provided through the recess 27b and the gap 27a. The claw pin 23 may be removably inserted in the through-hole 27c.

Attaching the claw 20 to the claw holder 26 is being described. First, the root 22 of the claw 20 may be put in the gap 27a of the claw pin hold 27. The claw pin 23 may be inserted in the through-hole 27c of the hold 27 each and the through-hole 22a of the root 22. Then a stop sing 24 may be attached to both ends of the claw pin (FIG. 3). The claw holder 26 having the claw 20 may be rotated on the spindle axis AX0.

The shifter 10 of the chucking mechanism 6a may be movable in the Z-axis direction and rotatable on the spindle axis AX0 in a position outside the recess 20a of the claw 20 and the thinner diameter portion 26b of the claw holder 26 with respect to the spindle axis AX0. The shifter 10 may slide in the Z-axis direction within a range of the claw 20 disposed between the front bearing B1 and the rear bearing B2. The shifter 10 may be brought in the first position LO1 to bring the claw 20 into the first posture PO1 and in the second position LO2 to bring the claw 20 into the second posture PO2. The shifter 10 may entirely overlap the claw 20 in the Z-axis direction. The embodiment provides a shorter chucking mechanism in the Z-axis direction compared to the chucking mechanism of outer-claw type. The embodiment further provides a lightweight chucking mechanism by eliminating the need of the extended heavier portion 22c as provided in the outer-claw type (FIG. 13, 14)

The shifter 10 may have a through-hole 10a for receiving the claw holder 26 in the Z-axis direction (FIG. 7). The shifter 10 may have the outward groove 12 entirely formed around the outer surface 11 thereof with respect to the spindle axis AX0 to receive the insertion part 68a of the shifter lever 68 (FIG. 8). The outward groove 12 may have the front side surface 12a and the rear side surface 12b opposite to each other in the Z-axis direction (FIG. 3, 8) and further have a bottom surface 12c between the front side surface 12a and the rear side surface 12b. The bottom surface 12c may have a recess 12d stepped down toward the spindle axis AX0 to receive the fixed part of the inner ring of the shifter bearing B3 as shown in FIG. 9 to FIG. 12.

The roller 15 rolling in the Z-axis direction may be mounted on the rear end of the shifter 10 in the contact position with the claw 20 as shown in FIG. 2 to FIG. 4. The roller 15 may have the insertion hole 15a for receiving the roller pin 16 along the direction of the rolling axis AX3. The roller 15 may roll jyouon the roller pin 16 passed in the insertion hole 15a. The shifter 10 may be provided with the hold 14 removably having the roller pin 16 in a position on the rear side of the outward groove 12. As shown in FIG. 3 and FIG. 7, the hold 14 may be divided by a gap 14a receiving the roller 15. The shifter 10 may have a recess 14b adjacent to the hold 14 each. The hold 14 each may be a part between the gap 14a and the recess 14b. The hold 14 each may have an insertion hole 14c provided through the recess 14b and the gap 14a. The roller pin 16 may be removably passed in the insertion hole 14c.

Attaching the roller 15 to the shifter 10 is being described. First, the roller 15 may be put in the gap 14a of the hold 14. The roller pin 16 may be passed in the insertion hole 14c of the hold 14 each and the insertion hole 15a of the roller 15. Then a stop sing 17 may be attached to both the ends of the roller pin 16. The roller 15 may be thereby attached to the shifter 10 operably on the rolling axis AX3. In removing the roller 15 from the shifter 10, the stop ring 17 may be removed to pull the roller pin 16 out from the insertion hole 15a.

The shifter drive unit DR1 may include the shifter lever 68 provided with the shifter bearing B3 and the collet actuator 69 as shown in FIG. 2 and FIG. 8. The shifter drive unit DR1 may have the shifter lever 68 in opposite positions with respect to the spindle axis AX0 as shown in FIG. 9 to FIG. 12. The shifter lever 68 each may have a base end 68b, a distal end 68c, and a pivot 68d. The insertion part 68a of the shifter lever 68 may be provided on an opposite surface near the distal end 68c to be received by the outward groove 12 of the shifter 10. When the base end 68b is driven by the actuator 69, the shifter lever 68 may turn about the pivot 68d to move the distal end 68c a little approximately in the Z-axis direction, and thereby move the shifter 10 in the Z-axis direction. The shifter 10 may rotate on the spindle axis AX0. The shifter lever 68, however, may not rotate on the spindle axis AX0. The insertion part 68a of the shifter lever 68 may be therefore provided with the shifter bearing B3 capable of being brought into contact with the side surface 12a, 12b of the outward groove 12 as shown in FIG. 9 to FIG. 12. The outer ring of the shifter bearing B3 may be rotatable on a rotation axis AX4 perpendicular to the spindle axis AX0 to be possibly in contact with the side surface 12a, 12b of the outward groove 12. The shifter lever 68 may be brought in such a position as to keep the outer ring of the shifter bearing B3 separated from both the front side surface 12a and the rear side surface 12b. Accordingly, the outer ring of the shifter bearing B3 may be allowed to touch only one of the front side surface 12a and the rear side surface 12b of the outward groove 12.

The actuator 69 may include a cylinder 69a and a piston 69b protruding from the cylinder 69a to be rotatably connected to the base end 68b of the shifter lever 68. The actuator 69 may drive the shifter lever 68 under control of the NC apparatus 80. The actuator 69 may be an electronic actuator having a electronic cylinder. An air cylinder and a hydraulic cylinder may be used instead.

The shifter bearing may include a rolling bearing whose inner ring rotatable with respect to the spindle axis may fit in the groove to be brought into contact with the shifter. Such shifter may be referred to as a coaxial shifter bearing. The coaxial shifter bearing may be mounted outside the shifter with respect to the spindle axis and therefore larger in diameter. In the embodiment, the outer ring may be rotatable on the rotation axis AX4 perpendicular to the spindle axis AX0. Such shifter bearing may be referred to as an opposite shifter bearing. The opposite shifter bearing may be smaller than the coaxial shifter bearing and also less expensive. If, however, such smaller shifter bearing is kept in contact with the side surface 12a, 12b of the outward groove 12 of the shifter 10, the shifter bearing B3 likely wears due to produced heat since it rotates faster than the back spindle 52 rotating on the spindle axis AX0.

In the embodiment, the shifter drive unit DR1 may drive the shifter lever 68 to separate the shifter bearing B3 from the side surface 12a, 12b of the outward groove 12 after moving the shifter 10 in the Z-axis direction. The shifter drive unit DR1 may be driven by the actuator 69 under control of the NC apparatus 80. The shifter drive unit DR1 may include the NC apparatus 80. The operation of the shifter drive unit DR1 is being explained referring to FIG. 2 and FIG. 8 to FIG. 12.

Figure 9:
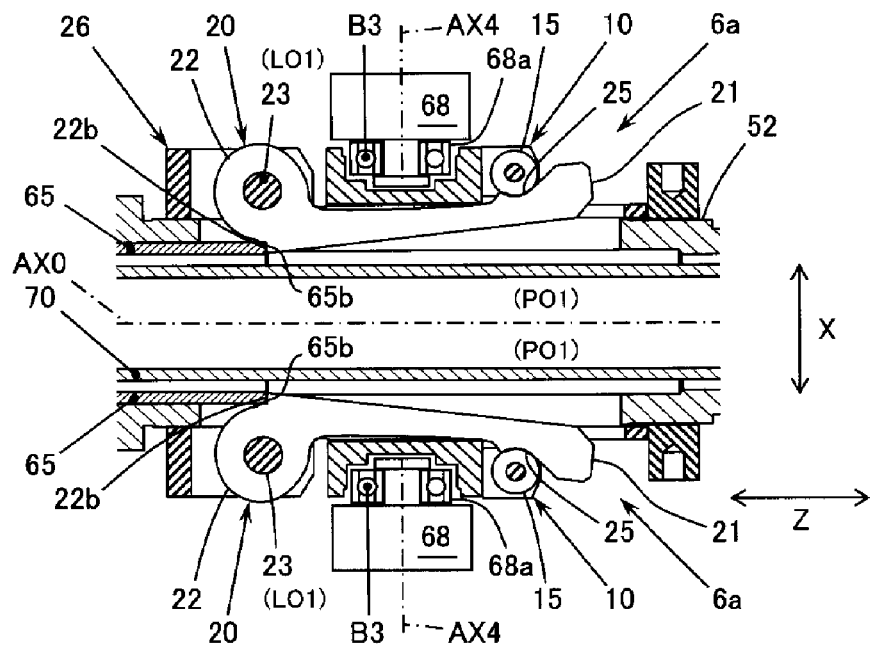
FIG. 9 is a vertical section view of the chucking mechanism in the state that a chuck is opened.
Figure 10:
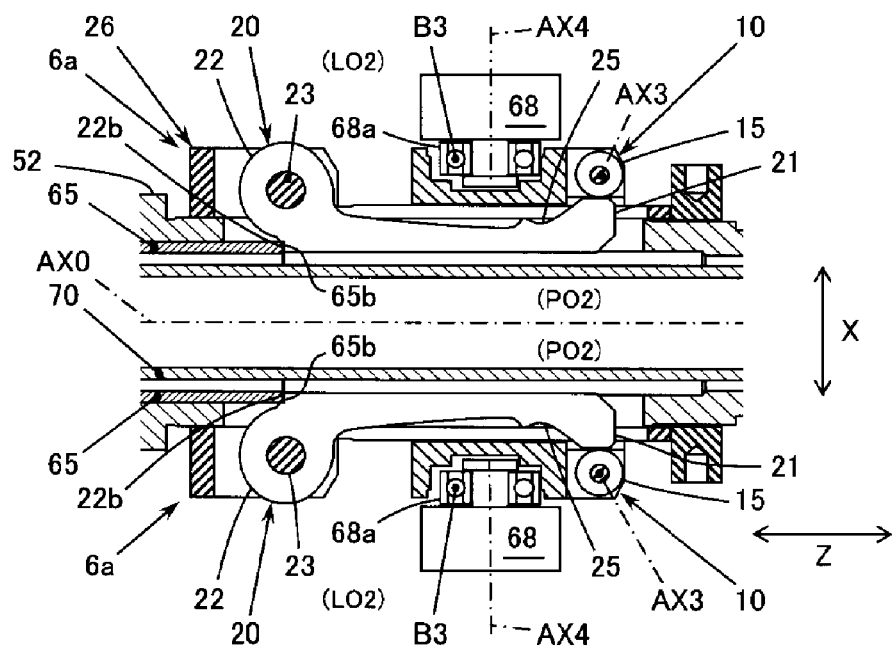
FIG. 10 is a vertical section view of the chucking mechanism when the shifter reaches a second position to close the chuck.

As shown in FIG. 9, the shifter 10 may be brought in the first position LO1 on the front side to bring the claw 20 into the first posture PO1 with the movable end 21 away from the spindle axis AX0. The collet 61 may be brought into the opened state ST1 (FIG. 2) and the shifter bearing B3 may be separated from both the side surfaces 12a and 12b (FIG. 8) of the outward groove 12 of the shifter 10. Tightening the collet 61 to hold the workpiece W0 is being explained. The NC apparatus 80 may drive the shifter lever 68 to advance the piston 69b protruding from the cylinder 69a toward the front and thereby bring the insertion part 68a toward the rear. The outer ring of the shifter bearing B3 may be brought into contact with the rear side surface 12b to move the shifter 10 to the second position LO2 on the rear side as shown in FIG. 10. As the result, the roller 15 of the shifter 10 may roll on the rolling axis AX3 from the groove 25 to the movable end 21 to bring the claw 20 into the second posture PO2 with the movable end 21 close to the spindle axis AX0. The contact end 22b of the claw 20 may push the chuck sleeve 63 toward the front by the push sleeve 65 (FIG. 2). The inverted tapered part 63a of the chuck sleeve 63 may push the tapered part 61a of the collet 61 toward the spindle axis AX0. The collet 61 may be thereby brought into the closed state ST2.

Figure 11:
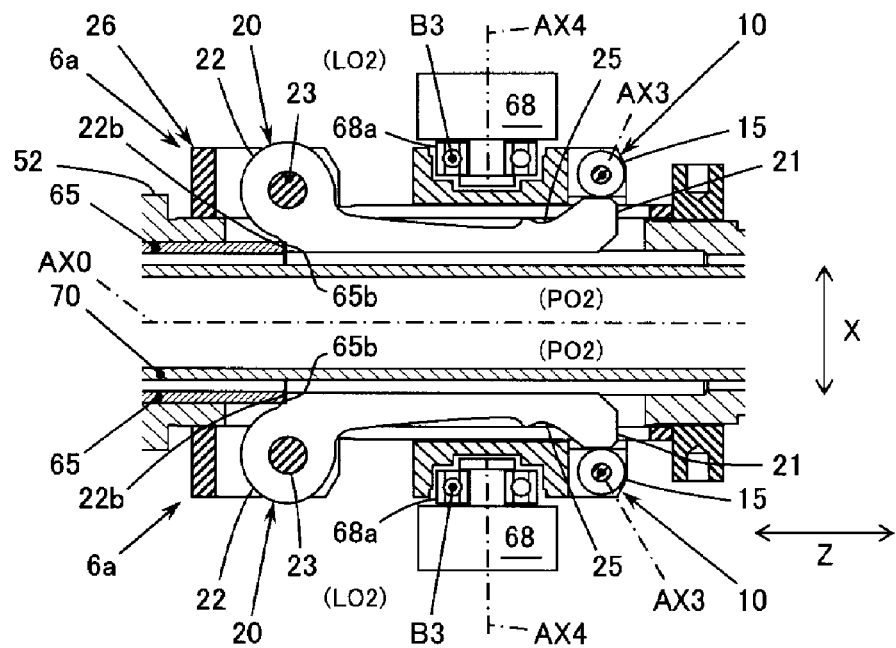
FIG. 11 is a vertical section view of the chucking mechanism in the state that an insertion part of a shifter lever is separated from both side surfaces of an outward groove when the shifter is in the second position.

The NC apparatus 80 may then drive the shifter lever 68 by the actuator 69 to separate the shifter bearing B3 from the rear side surface 12b to the extent not to touch the front side surface 12a. The piston 69b protruding from the cylinder 69a may move a little bit to the rear and the distal end 68c of the shifter lever 68 may thereby move a little bit to the front. As the result, the shifter bearing B3 may be separated from both the side surfaces 12a and 12b of the outward groove 12 while the shifter 10 stays in the second position LO2 as shown in FIG. 11. The shifter bearing B3 is not rotated even if the shifter 10 rotates at high speed on the spindle axis AX0.

Figure 12:
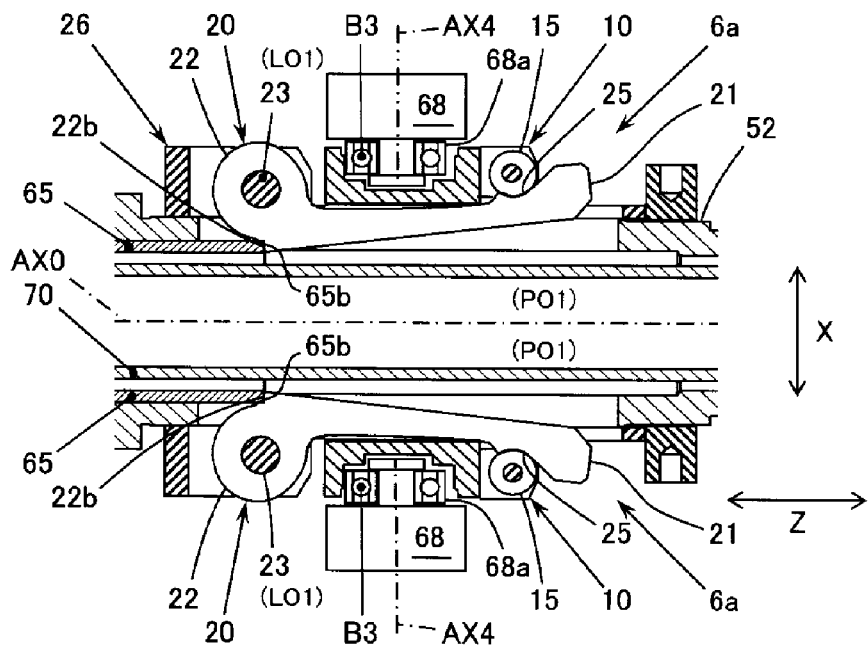
FIG. 12 is a vertical section view of the chucking mechanism when the shifter reaches a first position to open the chuck.

Opening the collet 61 to release the workpiece W0 is being explained. The NC apparatus 80 may drive the shifter lever 68 to retract the piston 69b protruding from the cylinder 69a toward the rear and thereby bring the insertion part 68a toward the front. The outer ring of the shifter bearing B3 may be brought into contact with the front side surface 12a to move the shifter 10 to the first position LO1 on the front side as shown in FIG. 12. As the result, the roller 15 of the shifter 10 may roll on the rolling axis AX3 from the movable end 21 to the groove 25. The collet open spring 64 may push the push sleeve 65 toward the rear by the chuck sleeve 63 (FIG. 2) to bring the claw 20 into the first posture PO1 with the movable end 21 away from the spindle axis AX0. The inverted tapered part 63a of the chuck sleeve 63 pushing the tapered part 61a of the collet 61 toward the spindle axis AX0 may be retracted. The collet 61 may be thereby brought into the opened state ST1.

The NC apparatus 80 may then drive the shifter lever 68 by the actuator 69 to separate the shifter bearing B3 from the front side surface 12a to the extent not to touch the rear side surface 12b. The piston 69b protruding from the cylinder 69a may move a little bit to the front and the distal end 68c of the shifter lever 68 may thereby move a little bit to the rear. As the result, the shifter bearing B3 may be separated from both the side surfaces 12a and 12b of the outward groove 12 while the shifter 10 stays in the first position LO1 as shown in FIG. 9. The shifter bearing B3 is not rotated even if the shifter 10 rotates at high speed on the spindle axis AX0.

As described above, the opposite shifter bearing B3 may touch the front side surface 12a or the rear side surface 12b of the outward groove 12 only when the collet 61 is switched between the opened state ST1 and the closed state ST2. The opposite shifter bearing B3 in this embodiment can reduce the number of rotations compared to the coaxial shifter bearing B3 rotating following the rotation of the shifter on the spindle axis. Reduced rotations prevent occurance of heat and thereby suppress wear of the shifter bearing B3. The embodiment provides a lathe capable of elongating the life of the shifter bearing that is small and inexpensive.

(3) EFFECT OF THE EMBODIMENT

As shown in FIG. 1, a plurality of the structures including the tool post 30 may exist in a forward area of the back headstock 51. The body part 51a (FIG. 2) of the back headstock 51 can approach the guide bush 35 only to the extent that interference with the structures is avoided. The back spindle 52 may have the elongated front part to be supported by the elongated part 51b of the back headstock 51. That would increase an inner space of the elongated part 51b in the Z-axis direction. It is, however, difficult to simply dispose the chucking mechanism 6b (FIG. 13, FIG. 14) between the front bearing and the back bearing where the built-in motor is mounted. An additional intermediate bearing would be required to rotatably support the high speed rotation spindle since the chucking mechanism 6b (outer-claw type) is longitudinal in the spindle axis direction. Such arrangement would make the headstock structure complicated and elongate the front part of the spindle too long. Further, the chucking mechanism disposed in a position on the rear side of the rear bearing would be disadvantageous to high speed rotations of the spindle.

In the chucking mechanism 6a as shown in FIG. 2 to FIG. 4 and FIG. 9 to FIG. 12, the claw 20 may be mounted outside the back spindle 52 and the shifter 10 may be mounted outside the claw 20 movably in the Z-axis direction. The chucking mechanism 6a of inner-claw type is shorter than the chucking mechanism 6b of outer-claw type in the Z-axis direction. The shorter chucking mechanism 6a may be mounted between the front bearing B1 and the rear bearing B2 where the built-in motor is mounted without a need of the additional intermediate bearing to ensure high speed rotations of the back spindle 52. The chucking mechanism 6a may be mounted in an inner space of the elongated front part of the back headstock 51 adapted to the elongated front part of the back spindle 52. Such arrangement could shorten the rear part of the back spindle 52 instead. The chucking mechanism 6a may be smaller in diameter than the built-in motor 55. The chucking mechanism 6a may be therefore suitable for the space of the elongated front part of the back headstock 51 to avoid interference with the structures. The embodiment as described above shortens the back spindle 52 in the Z-axis direction and further simplifies the chuck operating apparatus 6 since the chucking mechanism 6a is closer to the collet 61 mounted at the front end of the back spindle 52.

The roller 15 may be attached to the shifter 10 in the contact position with the claw 20. The roller 15 may roll in the spindle axis direction as the chuck 60 is operated. The friction of the shifter 10 against the claw 20 is reduced and the load on the actuator 69 is thereby reduced. The roller 15 and the claw 20 touching each other gradually wear but wear amount is reduced. The embodiment facilitates parts replacement since replacement of the roller 15 does not require a time-consuming replacement of the whole shifter 10 mounted entirely around the back spindle 52. Replacement of the roller 15 is easier for the operator. The operator can take the roller 15 out of the shifter 10 outward in the diameter direction perpendicular to the spindle axis AX0 only by removing the roller pin 16 from the hold 14. The operator can attach the roller 15 to the shifter 10 only by mounting the pin 16 passed in the hole 15a to the hold 14. Replacement of the claw 20 is easier since the claw 20 is not mounted entirely around the back spindle 52. The embodiment provides a lathe capable of facilitating maintenance of the chucking mechanism.

To suppress wear of the shifter bearing B3 of opposite-type, it may be necessary to keep the shifter bearing B3 separated from both the side surfaces 12a and 12b of the outward groove 12 of the shifter 10 after moving the shifter 10 in the Z-axis direction. As shown in FIG. 11, the roller 15 of the shifter 10 brought in the second position LO2 on the rear side may push the movable end 21 of the claw 20 toward the spindle axis AX0 to bring the collet 61 into the closed state ST2 to hold the workpiece W0. The roller 15 receives strong force from the movable end 21 to prevent the shifter 10 from moving in the Z-axis direction with the shifter bearing B3 kept separated from both the side surfaces 12a and 12b of the outward groove 12. As shown in FIG. 9, the roller 15 of the shifter 10 brought in the first position LO1 on the front side may fit in the groove 25 of the claw 20 to bring the collet 61 into the opened state ST1 to release the workpiece W0 with the shifter bearing B3 kept separated from both the side surfaces 12a and 12b of the outward groove 12. Without the groove 25, the roller 15 would receive little force from the collet open spring 64 to allow the shifter 10 to move in the Z-axis direction. The shifter bearing B3 would thereby undesirably brought into contact with the side surface 12a, 12b. The embodiment provides a lathe capable of elongating the life of the shifter bearing.

(4) MODIFICATIONS

The invention may be embodied in various modifications. The lathe may be a lathe of slidable-spindle type and instead a lathe of stationary-spindle type. The spindle may be the sub spindle and instead the main spindle. The number of claws may be two and instead three or more.

The shifter bearing may be the shifter bearing of coaxial type and the claw 20 may not be provided with the groove 25 in Embodiments 1 to 5. The shifter 10 may not be provided with the roller 15 in Embodiments 1 to 3. The roller may be attached to the claw in the contact position with the shifter to roll in the Z-axis direction in Embodiments 1 to 3, 6 and 7. The chucking mechanism may be mounted in a position on the rear side of the rear bearing B2 or may be replaced by the chucking mechanism of outer-claw type in Embodiments 4 to 7.

FIG. 13 and FIG. 14 each representing an example included in Embodiments 4 to 7 of the invention shows a vertical section view around the chucking mechanism 6b of outer-claw type disposed in a position on the rear side of the rear bearing B2 (not shown). In FIG. 13, the shifter 10 may be brought in the second position LO2 on the rear side to bring the claw 20 into the second posture PO2. The collet 61 (not shown) may be brought into the closed state ST2. In FIG. 14, the shifter 10 may be brought in the first position LO1 on the front side to bring the claw 20 into the first posture PO1. The collet 61 (not shown) may be brought into the opened state ST1.

The shifter 10 (FIG. 13, 14) may be of a shape surrounding the back spindle 52 on the spindle axis AX0 and in contact with a plurality of the claws 20. The roller 15 may be removably mounted on the shifter 10 in a contact position with the claw 20 on the rear side of the outward groove 12 receiving the shifter bearing B3. The roller 15 may roll in the Z-axis direction. The claw 20 may have the movable end 21 protruding forwards and the extended portion 22c elongated rearwards on the rear side of the claw pin 23. The claw 20 may tilt in the direction that the distance between the movable end 21 and the spindle axis AX0 varies. The claw 20 may have the groove 25 formed near the movable end 21 to receive the roller 15 when the collet 61 is in the opened state ST1.

The collet 61 in the closed state ST2 (FIG. 13) is being opened in a manner as described below. The shifter lever 68 may be driven to move the shifter bearing B3 forwards to thereby push the shifter 10 forwards. The roller 15 of the shifter 10 may roll on the rolling axis AX3 toward the movable end 21 until it reaches the groove 25. The collet open spring 64 may push the push sleeve 65 rearwards by the chuck sleeve 63 (FIG. 2). The movable end 21 may thereby approach the spindle axis AX0 to bring the claw 20 into the first posture PO1. The chuck sleeve 63 moves rearwards to release the collet 61 into the opened state ST1 (FIG. 14).

The shifter lever 68 may be then driven to separate the shifter bearing B3 from the side surface of the outward groove of the shifter 10. The shifter bearing B3 can be kept separated from both the side surfaces of the outward groove since the roller 15 of the shifter 10 fits in the groove 25 of the claw 20. The shifter bearing B3 therefore does not rotate at high speed even if the shifter 10 rotates at high speed on the spindle axis AX0, which elongates the life of the shifter bearing B3.

Figure 15:
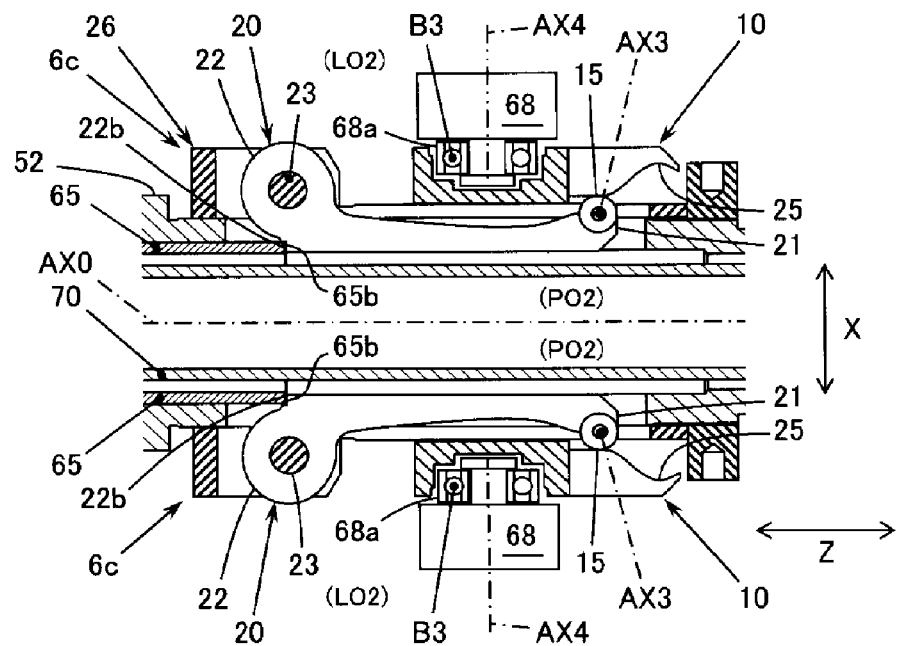
FIG. 15 is a vertical section view of the chucking mechanism of inner-claw type provided with a claw having a roller in the state that the chuck is closed.
Figure 16:
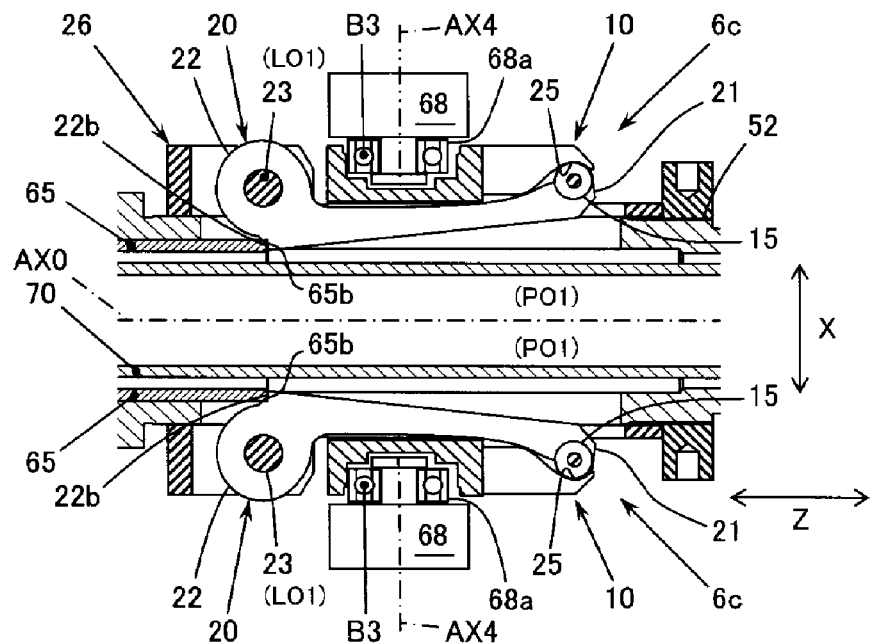
FIG. 16 is a vertical section view of the chucking mechanism of inner-claw type provided with a claw having a roller in the state that the chuck is opened.

FIG. 15 and FIG. 16 each representing an example included in Embodiments 1 to 3, 6 and 7 of the invention shows a vertical section view around a chucking mechanism 6c of inner-claw type disposed between the bearings B1 and B2 (not shown). In FIG. 15, the shifter 10 may be brought in the second position LO2 on the rear side to bring the claw 20 into the second posture PO2. The collet 61 (not shown) may be brought into the closed state ST2. In FIG. 16, the shifter 10 may be brought in the first position LO1 on the front side to bring the claw 20 into the first posture PO1. The collet 61 (not shown) may be brought into the opened state ST1. In Embodiments 6 and 7, the claw may be an example of one of the members and the shifter may be an example of the other.

The roller 15 may be removably mounted on the claw 20 in a contact position with the shifter 10 near the movable end 21. The roller 15 may roll in the Z-axis direction. The shifter 10 may have the groove 25 formed in a position on the rear side of the outward groove receiving the shifter bearing B3 to receive the roller 15 when the collet 61 is in the opened state ST1.

The collet 61 in the closed state ST2 (FIG. 15) is being opened in a manner as described below. The shifter lever 68 may be driven to move the shifter bearing B3 forwards to thereby push the shifter 10 forwards. The roller 15 of the claw 20 may roll on the rolling axis AX3 toward the rear end of the shifter 10 until it reaches the groove 25. The collet open spring 64 may push the push sleeve 65 rearwards by the chuck sleeve 63 (FIG. 2). The movable end 21 may thereby move away from the spindle axis AX0 to bring the claw 20 into the first posture PO1. The chuck sleeve 63 moves rearwards to release the collet 61 into the opened state ST1 (FIG. 16).

The shifter lever 68 may be then driven to separate the shifter bearing B3 from the side surface of the outward groove of the shifter 10. The shifter bearing B3 can be kept separated from both the side surfaces of the outward groove since the roller 15 of the claw 20 fits in the groove 25 of the claw 20. The shifter bearing B3 therefore does not rotate at high speed even if the shifter 10 rotates at high speed on the spindle axis AX0, which elongates the life of the shifter bearing B3.

(5) CONCLUSION

As described above, the invention provides a lathe capable of shortening the spindle with respect to the spindle axis direction, a lathe capable of facilitating maintenance of the chucking mechanism, and a lathe capable of elongating the life of the shifter mechanism. The essential operations and effects of the invention may be available even from only the elements of independent claim. The elements disclosed in the embodiments may be mutually replaced or the combination thereof may be changed. The disclosed elements may be mutually replaced by prior art of the combination thereof may be changed. Such replacement and change may be within the scope of the invention.

What is claimed is:
1. A lathe comprising:
a spindle rotatable on a spindle axis and provided with a chuck having a closed state to hold a workpiece and an opened state to release the workpiece; and a chuck operating apparatus which opens and closes the chuck, comprising:

a tilt claw provided outside the spindle and rotatable on the spindle axis, the claw having a first posture to bring the chuck into the opened state and a second posture to bring the chuck into the closed state;

a shifter provided outside the spindle and rotatable on the spindle axis, the shifter being movable in a direction of the spindle axis to be brought in a first position to bring the claw into the first posture and in a second position to bring the claw into the second posture; and a driving unit having a shifter lever which moves the shifter in the direction of the spindle axis, wherein an outward groove is entirely formed around an outer surface of the shifter with respect to the spindle axis to receive an insertion part of the shifter lever, the insertion part of the shifter lever has a shifter bearing capable of being brought into contact with a side surface of the outward groove, a roller is provided on the shifter in a contact position with the claw to roll in the direction of the spindle axis with a roller pin and a groove is formed on the claw to receive the roller when the chuck is in the opened state, the roller has a first insertion hole through which the roller pin is passing in a direction of a rolling axis of the roller, and is rollable around the roller pin, the shifter is provided with a plurality of holds, each of which is divided by a gap receiving the roller and has a second insertion hole through which the roller pin is removably passed to couple the roller to the shifter, the driving unit is configured to drive the shifter lever to have the shifter bearing spaced apart from the side surface of the outward groove after moving the shifter in the direction of the spindle axis, the claw includes a root having an insertion hole into which a claw pin is inserted, the claw has a recess and a groove formed on the outer surface of the claw between the root and a movable end of the claw, the recess and the groove are divided by a hill therebetween, the groove is located between the recess and the movable end and is narrower than the recess, the shifter is located within the recess and the groove in the first posture of the claw, and at least a part of the shifter is located on the movable end of the claw in the second posture of the claw.

* * * * *